United States Patent
Deliwala et al.

(10) Patent No.: US 12,406,632 B2
(45) Date of Patent: Sep. 2, 2025

(54) CONTINUOUS WAVEFORM DRIVING IN MULTI-COLOR ELECTROPHORETIC DISPLAYS

(71) Applicant: E INK CORPORATION, Billerica, MA (US)

(72) Inventors: Amit Deliwala, Andover, MA (US); Sunil Krishna Sainis, Melrose, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/789,250

(22) Filed: Jul. 30, 2024

(65) Prior Publication Data

US 2024/0386857 A1    Nov. 21, 2024

Related U.S. Application Data

(62) Division of application No. 18/326,832, filed on May 31, 2023, now Pat. No. 12,125,449, which is a division of application No. 17/666,013, filed on Feb. 7, 2022, now Pat. No. 12,131,713.

(60) Provisional application No. 63/147,465, filed on Feb. 9, 2021.

(51) Int. Cl.
    *G02F 1/167*     (2019.01)
    *G02F 1/1676*    (2019.01)
    *G02F 1/1685*    (2019.01)
    *G09G 3/34*      (2006.01)

(52) U.S. Cl.
    CPC .......... *G09G 3/344* (2013.01); *G02F 1/167* (2013.01); *G02F 1/1676* (2019.01); *G02F 1/1685* (2019.01); *G09G 2300/0842* (2013.01); *G09G 2330/021* (2013.01)

(58) Field of Classification Search
    CPC ........ G02F 1/133; G02F 1/167; G02F 1/1676; G02F 1/1685; G09G 5/00; G09G 5/02; G09G 5/10; G09G 3/20; G09G 3/34; G09G 3/344; G09G 2300/0842; G09G 2330/021; G02B 26/00; G02B 26/08
    See application file for complete search history.

(56) References Cited

U.S. PATENT DOCUMENTS

| | | |
|---|---|---|
| 4,418,346 A | 11/1983 | Batchelder |
| 5,872,552 A | 2/1999 | Gordon, II et al. |
| 5,930,026 A | 7/1999 | Jacobson et al. |

(Continued)

FOREIGN PATENT DOCUMENTS

KR    20070024752 A    3/2007

OTHER PUBLICATIONS

Korean Intellectual Property Office, "International Search Report and Written Opinion", PCT/US2022/015475, May 18, 2022.

(Continued)

*Primary Examiner* — Chanh D Nguyen
*Assistant Examiner* — Nguyen H Truong
(74) *Attorney, Agent, or Firm* — Jason P. Colangelo

(57) ABSTRACT

Continuous waveforms for driving a four-particle electrophoretic medium including four different types of particles, for example a set of scattering particles and three sets of subtractive particles. Methods for identifying a preferred waveform for a target color state or a target transition when using a continuous or quasi-continuous voltage driver/controller.

17 Claims, 11 Drawing Sheets
(5 of 11 Drawing Sheet(s) Filed in Color)

(56) References Cited

U.S. PATENT DOCUMENTS

| | | |
|---|---|---|
| 6,017,584 A | 1/2000 | Albert et al. |
| 6,130,774 A | 10/2000 | Albert et al. |
| 6,144,361 A | 11/2000 | Gordon, II et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 * | 3/2003 | Gates .................... G02F 1/167 345/97 |
| 6,545,797 B2 | 4/2003 | Chen et al. |
| 6,664,944 B1 | 12/2003 | Albert et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,788,452 B2 | 9/2004 | Liang et al. |
| 6,825,970 B2 | 11/2004 | Goenaga et al. |
| 6,900,851 B2 | 5/2005 | Morrison et al. |
| 6,914,714 B2 | 7/2005 | Chen et al. |
| 6,922,276 B2 | 7/2005 | Zhang et al. |
| 6,972,893 B2 | 12/2005 | Chen et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,038,656 B2 | 5/2006 | Liang et al. |
| 7,038,670 B2 | 5/2006 | Liang et al. |
| 7,046,228 B2 | 5/2006 | Liang et al. |
| 7,052,571 B2 | 5/2006 | Wang et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,167,155 B1 | 1/2007 | Albert et al. |
| 7,170,670 B2 | 1/2007 | Webber |
| 7,177,066 B2 | 2/2007 | Chung et al. |
| 7,193,625 B2 | 3/2007 | Danner et al. |
| 7,202,847 B2 | 4/2007 | Gates |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,327,511 B2 | 2/2008 | Whitesides et al. |
| 7,339,715 B2 | 3/2008 | Webber et al. |
| 7,385,751 B2 | 6/2008 | Chen et al. |
| 7,408,699 B2 | 8/2008 | Wang et al. |
| 7,411,719 B2 | 8/2008 | Paolini, Jr. et al. |
| 7,453,445 B2 | 11/2008 | Amundson |
| 7,492,339 B2 | 2/2009 | Amundson |
| 7,492,505 B2 | 2/2009 | Liang et al. |
| 7,528,822 B2 | 5/2009 | Amundson et al. |
| 7,535,624 B2 | 5/2009 | Amundson et al. |
| 7,583,251 B2 | 9/2009 | Arango et al. |
| 7,602,374 B2 | 10/2009 | Zehner et al. |
| 7,612,760 B2 | 11/2009 | Kawai |
| 7,667,684 B2 | 2/2010 | Jacobson et al. |
| 7,679,599 B2 | 3/2010 | Kawai |
| 7,679,814 B2 | 3/2010 | Paolini, Jr. et al. |
| 7,683,606 B2 | 3/2010 | Kang et al. |
| 7,715,088 B2 | 5/2010 | Liang et al. |
| 7,787,169 B2 | 8/2010 | Abramson et al. |
| 7,800,813 B2 | 9/2010 | Wu et al. |
| 7,839,564 B2 | 11/2010 | Whitesides et al. |
| 7,859,742 B1 | 12/2010 | Chiu et al. |
| 7,910,175 B2 | 3/2011 | Webber |
| 7,952,557 B2 | 5/2011 | Amundson |
| 7,952,790 B2 | 5/2011 | Honeyman et al. |
| 7,982,479 B2 | 7/2011 | Wang et al. |
| 7,982,941 B2 | 7/2011 | Lin et al. |
| 7,999,787 B2 | 8/2011 | Amundson et al. |
| 8,009,348 B2 | 8/2011 | Zehner et al. |
| 8,040,594 B2 | 10/2011 | Paolini, Jr. et al. |
| 8,054,526 B2 | 11/2011 | Bouchard |
| 8,077,141 B2 | 12/2011 | Duthaler et al. |
| 8,098,418 B2 | 1/2012 | Paolini, Jr. et al. |
| 8,125,501 B2 | 2/2012 | Amundson et al. |
| 8,139,050 B2 | 3/2012 | Jacobson et al. |
| 8,159,636 B2 | 4/2012 | Sun et al. |
| 8,174,490 B2 | 5/2012 | Whitesides et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,314,784 B2 | 11/2012 | Ohkami et al. |
| 8,363,299 B2 | 1/2013 | Paolini, Jr. et al. |
| 8,373,649 B2 | 2/2013 | Low et al. |
| 8,384,658 B2 | 2/2013 | Albert et al. |
| 8,422,116 B2 | 4/2013 | Sprague et al. |
| 8,456,414 B2 | 6/2013 | Lin et al. |
| 8,462,102 B2 | 6/2013 | Wong et al. |
| 8,503,063 B2 | 8/2013 | Sprague |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,576,470 B2 | 11/2013 | Paolini, Jr. et al. |
| 8,576,475 B2 | 11/2013 | Huang et al. |
| 8,605,032 B2 | 12/2013 | Liu et al. |
| 8,605,354 B2 | 12/2013 | Zhang et al. |
| 8,643,595 B2 | 2/2014 | Chung et al. |
| 8,649,084 B2 | 2/2014 | Wang et al. |
| 8,665,206 B2 | 3/2014 | Lin et al. |
| 8,670,174 B2 | 3/2014 | Sprague et al. |
| 8,681,191 B2 | 3/2014 | Yang et al. |
| 8,704,754 B2 | 4/2014 | Machida et al. |
| 8,704,756 B2 | 4/2014 | Lin |
| 8,717,664 B2 | 5/2014 | Wang et al. |
| 8,786,935 B2 | 7/2014 | Sprague |
| 8,797,634 B2 | 8/2014 | Paolini, Jr. et al. |
| 8,810,525 B2 | 8/2014 | Sprague |
| 8,810,899 B2 | 8/2014 | Sprague et al. |
| 8,873,129 B2 | 10/2014 | Paolini, Jr. et al. |
| 8,902,153 B2 | 12/2014 | Bouchard et al. |
| 8,902,491 B2 | 12/2014 | Wang et al. |
| 8,917,439 B2 | 12/2014 | Wang et al. |
| 8,928,562 B2 | 1/2015 | Gates et al. |
| 8,928,641 B2 | 1/2015 | Chiu et al. |
| 8,964,282 B2 | 2/2015 | Wang et al. |
| 8,976,444 B2 | 3/2015 | Zhang et al. |
| 9,013,394 B2 | 4/2015 | Lin |
| 9,013,783 B2 | 4/2015 | Sprague |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,116,412 B2 | 8/2015 | Lin |
| 9,146,439 B2 | 9/2015 | Zhang |
| 9,170,468 B2 | 10/2015 | Lin et al. |
| 9,177,511 B2 | 11/2015 | Sato et al. |
| 9,182,646 B2 | 11/2015 | Paolini, Jr. et al. |
| 9,195,111 B2 | 11/2015 | Anseth et al. |
| 9,199,441 B2 | 12/2015 | Danner |
| 9,218,773 B2 | 12/2015 | Sun et al. |
| 9,224,338 B2 | 12/2015 | Chan et al. |
| 9,224,342 B2 | 12/2015 | Lin et al. |
| 9,224,344 B2 | 12/2015 | Chung et al. |
| 9,230,492 B2 | 1/2016 | Harrington et al. |
| 9,262,973 B2 | 2/2016 | Wu et al. |
| 9,279,906 B2 | 3/2016 | Kang |
| 9,285,649 B2 | 3/2016 | Du et al. |
| 9,299,294 B2 | 3/2016 | Lin et al. |
| 9,341,916 B2 | 5/2016 | Telfer et al. |
| 9,360,733 B2 | 6/2016 | Wang et al. |
| 9,361,836 B1 | 6/2016 | Telfer et al. |

(56) References Cited

U.S. PATENT DOCUMENTS

| | | | |
|---|---|---|---|
| 9,373,289 B2 | 6/2016 | Sprague et al. | |
| 9,383,623 B2 | 7/2016 | Lin et al. | |
| 9,390,066 B2 | 7/2016 | Smith et al. | |
| 9,390,661 B2 | 7/2016 | Chiu et al. | |
| 9,423,666 B2 | 8/2016 | Wang et al. | |
| 9,459,510 B2 | 10/2016 | Lin | |
| 9,460,666 B2 | 10/2016 | Sprague et al. | |
| 9,495,918 B2 | 11/2016 | Harrington et al. | |
| 9,501,981 B2 | 11/2016 | Lin et al. | |
| 9,513,527 B2 | 12/2016 | Chan et al. | |
| 9,513,743 B2 | 12/2016 | Sjodin et al. | |
| 9,514,667 B2 | 12/2016 | Lin | |
| 9,541,814 B2 | 1/2017 | Lin et al. | |
| 9,612,502 B2 | 4/2017 | Danner et al. | |
| 9,620,048 B2 | 4/2017 | Sim et al. | |
| 9,671,668 B2 | 6/2017 | Chan et al. | |
| 9,672,766 B2 | 6/2017 | Sjodin | |
| 9,691,333 B2 | 6/2017 | Cheng et al. | |
| 9,697,778 B2 | 7/2017 | Telfer et al. | |
| 9,721,495 B2 | 8/2017 | Harrington et al. | |
| 9,759,980 B2 | 9/2017 | Du et al. | |
| 9,792,861 B2 | 10/2017 | Chang et al. | |
| 9,792,862 B2 | 10/2017 | Hung et al. | |
| 9,812,073 B2 | 11/2017 | Lin et al. | |
| 9,835,925 B1 | 12/2017 | Bull et al. | |
| 9,921,451 B2 | 3/2018 | Telfer et al. | |
| 9,922,603 B2 | 3/2018 | Lin | |
| 10,032,419 B2 | 7/2018 | Lin et al. | |
| 10,162,242 B2 | 12/2018 | Wang et al. | |
| 10,209,556 B2 | 2/2019 | Rosenfeld et al. | |
| 10,229,641 B2 | 3/2019 | Yang et al. | |
| 10,254,622 B2 | 4/2019 | Wang et al. | |
| 10,276,109 B2 | 4/2019 | Crounse et al. | |
| 10,319,313 B2 | 6/2019 | Harris et al. | |
| 10,339,876 B2 | 7/2019 | Lin et al. | |
| 10,353,266 B2 | 7/2019 | Bouchard et al. | |
| 10,444,553 B2 | 10/2019 | Laxton | |
| 10,467,984 B2 | 11/2019 | Buckley et al. | |
| 10,585,325 B2 | 3/2020 | Shao et al. | |
| 10,593,272 B2 | 3/2020 | Telfer et al. | |
| 10,672,350 B2 | 6/2020 | Amundson et al. | |
| 10,891,906 B2 | 1/2021 | Lin | |
| 11,049,463 B2 | 6/2021 | Lin et al. | |
| 11,151,951 B2 | 10/2021 | Lin et al. | |
| 2003/0102858 A1 | 6/2003 | Jacobson et al. | |
| 2004/0246562 A1 | 12/2004 | Chung et al. | |
| 2005/0253777 A1 | 11/2005 | Zehner et al. | |
| 2007/0103427 A1 | 5/2007 | Zhou et al. | |
| 2007/0176912 A1 | 8/2007 | Beames et al. | |
| 2008/0024426 A1* | 1/2008 | Chopra | G02F 1/167 345/107 |
| 2008/0024429 A1 | 1/2008 | Zehner | |
| 2008/0024482 A1 | 1/2008 | Gates et al. | |
| 2008/0043318 A1 | 2/2008 | Whitesides et al. | |
| 2008/0136774 A1 | 6/2008 | Harris et al. | |
| 2008/0303780 A1 | 12/2008 | Sprague et al. | |
| 2009/0225398 A1 | 9/2009 | Duthaler et al. | |
| 2010/0156780 A1 | 6/2010 | Jacobson et al. | |
| 2010/0194733 A1 | 8/2010 | Lin et al. | |
| 2010/0194789 A1 | 8/2010 | Lin et al. | |
| 2010/0265561 A1 | 10/2010 | Gates et al. | |
| 2011/0043441 A1* | 2/2011 | Tokunaga | G02F 1/167 252/573 |
| 2011/0043543 A1 | 2/2011 | Chen et al. | |
| 2011/0063314 A1 | 3/2011 | Chiu et al. | |
| 2011/0199671 A1* | 8/2011 | Amundson | G09G 3/344 359/296 |
| 2011/0221740 A1 | 9/2011 | Yang et al. | |
| 2012/0001957 A1 | 1/2012 | Liu et al. | |
| 2012/0098740 A1 | 4/2012 | Chiu et al. | |
| 2013/0063333 A1 | 3/2013 | Arango et al. | |
| 2013/0249782 A1 | 9/2013 | Wu et al. | |
| 2013/0250398 A1* | 9/2013 | Takanashi | C09C 1/48 423/449.8 |
| 2014/0055840 A1 | 2/2014 | Zang et al. | |
| 2014/0078576 A1 | 3/2014 | Sprague | |
| 2014/0192400 A1* | 7/2014 | Mochizuki | G02F 1/167 445/24 |
| 2014/0204012 A1 | 7/2014 | Wu et al. | |
| 2014/0232629 A1* | 8/2014 | Aoki | G09G 3/344 345/107 |
| 2014/0240210 A1 | 8/2014 | Wu et al. | |
| 2014/0253425 A1 | 9/2014 | Zalesky et al. | |
| 2014/0293398 A1 | 10/2014 | Wang et al. | |
| 2014/0362213 A1 | 12/2014 | Tseng | |
| 2015/0005720 A1 | 1/2015 | Zang et al. | |
| 2015/0262255 A1 | 9/2015 | Khajehnouri et al. | |
| 2015/0268531 A1 | 9/2015 | Wang et al. | |
| 2015/0301246 A1 | 10/2015 | Zang et al. | |
| 2016/0012710 A1 | 1/2016 | Lu et al. | |
| 2016/0180777 A1 | 6/2016 | Lin et al. | |
| 2019/0228716 A1* | 7/2019 | Fang | G09G 3/344 |
| 2021/0132459 A1 | 5/2021 | Bull | |

OTHER PUBLICATIONS

European Patent Office, "Extended European Search Report", EP Appl. No. 22753177.9, Dec. 16, 2024.

\* cited by examiner

WCMY

| | [A] | [B] | [C] | [D] | [E] | [F] | [G] | [H] |
|---|---|---|---|---|---|---|---|---|
| | White | Yellow | Red | Magenta | Blue | Cyan | Green | Black |

Viewing surface → Non-viewing surface stacks:

- [A]: White / Yellow / Magenta / Cyan
- [B]: Yellow / White / Cyan / Magenta
- [C]: Magenta / Yellow / White / Cyan
- [D]: Magenta / White / Cyan / Yellow
- [E]: Cyan / Magenta / White / Yellow
- [F]: Cyan / White / Magenta / Yellow
- [G]: Yellow / Cyan / White / Magenta
- [H]: Cyan / Magenta / Yellow / White

Fig. 3A

KRYB

| | VIEWING SURFACE | | | | | | |
|---|---|---|---|---|---|---|---|
| Red/Yellow/Blue Black | Red | Red/Yellow | Yellow | Yellow/Blue | Blue | Red/Blue | Black |
| | Black/ Yellow/Blue | Black/ Blue | Black/ Red/Blue | Black/ Red | Black/ Red/Yellow | Black/ Yellow | Red/Yellow/Blue |
| White | Red | Orange | Yellow | Green | Blue | Violet | Black |
| [A] | [B] | [C] | [D] | [E] | [F] | [G] | [H] |
| | | | NON-VIEWING SURFACE | | | | |

Fig. 3B

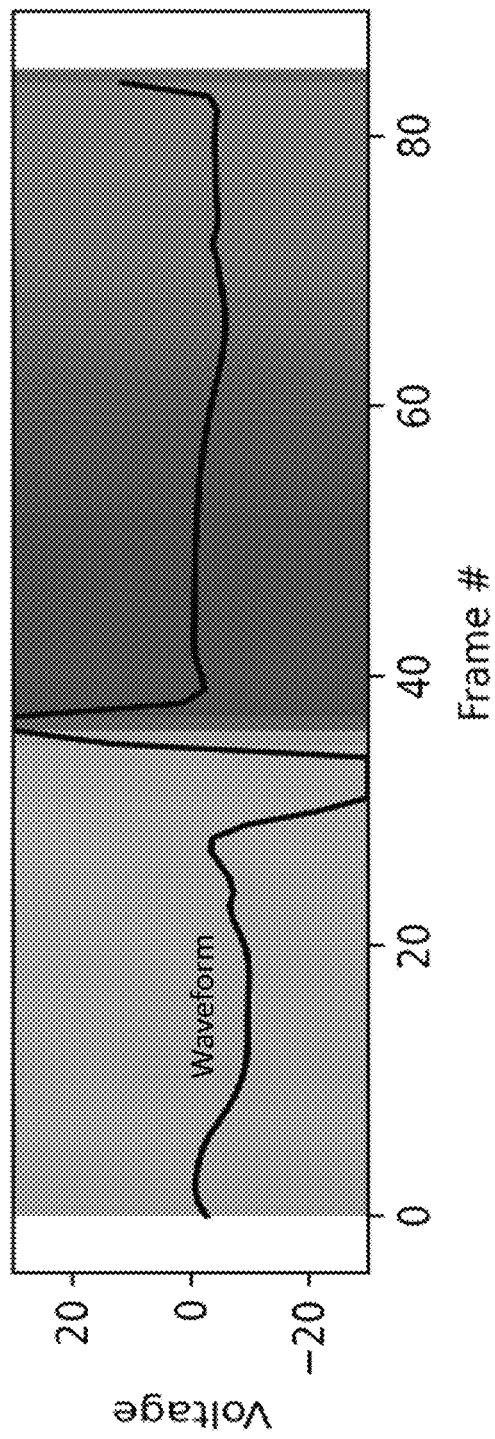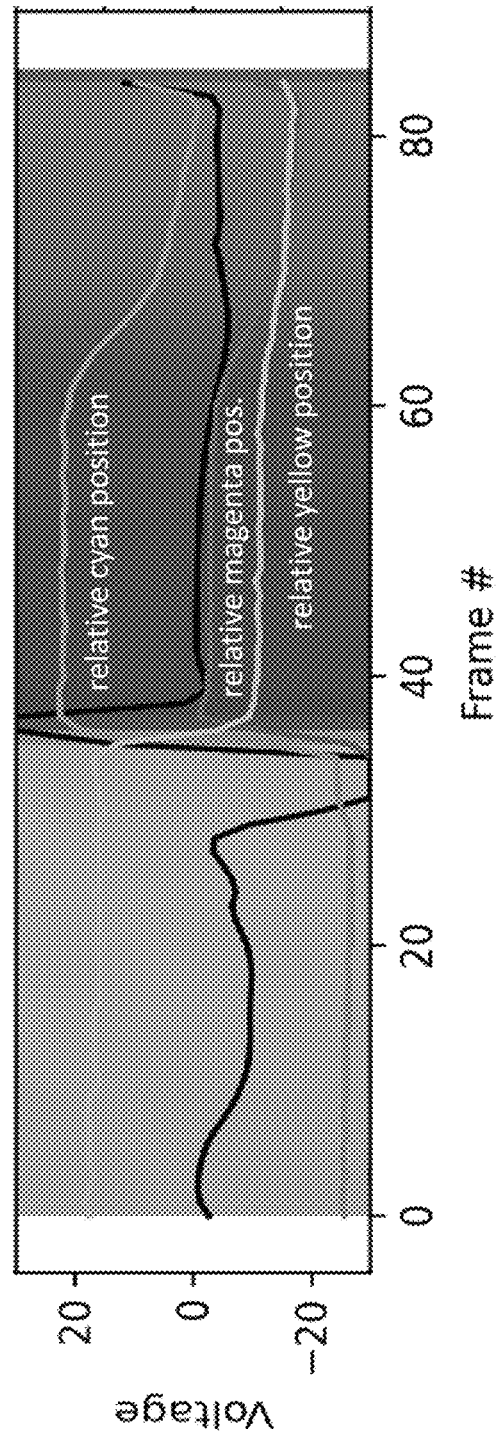

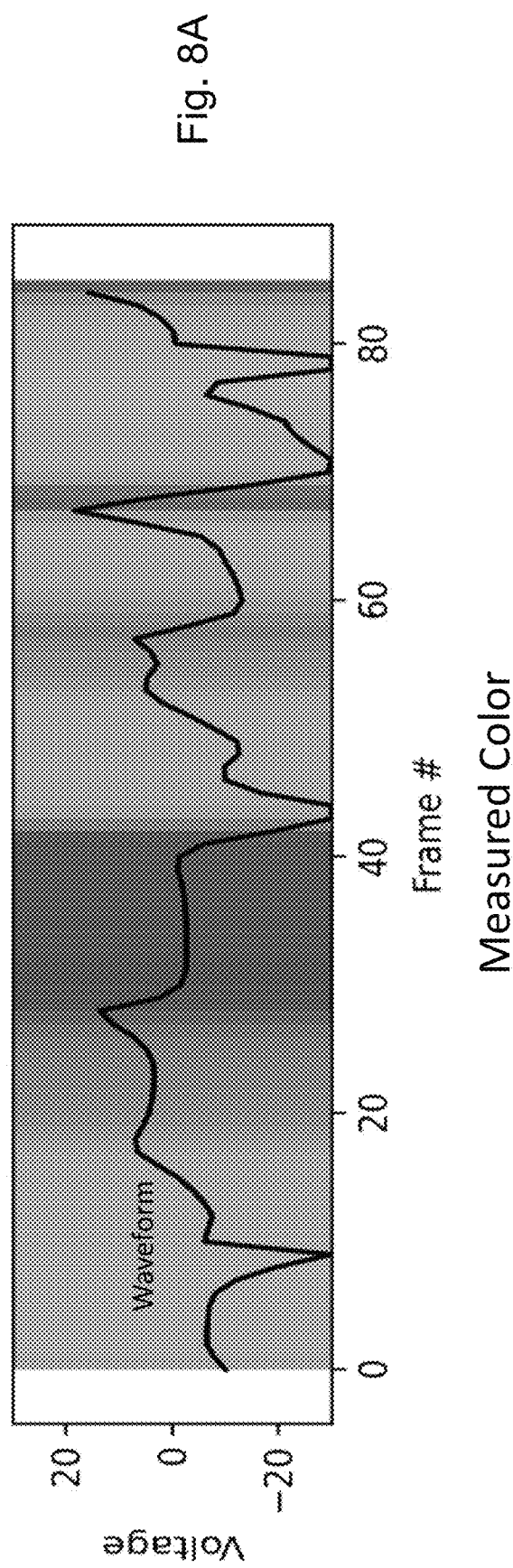
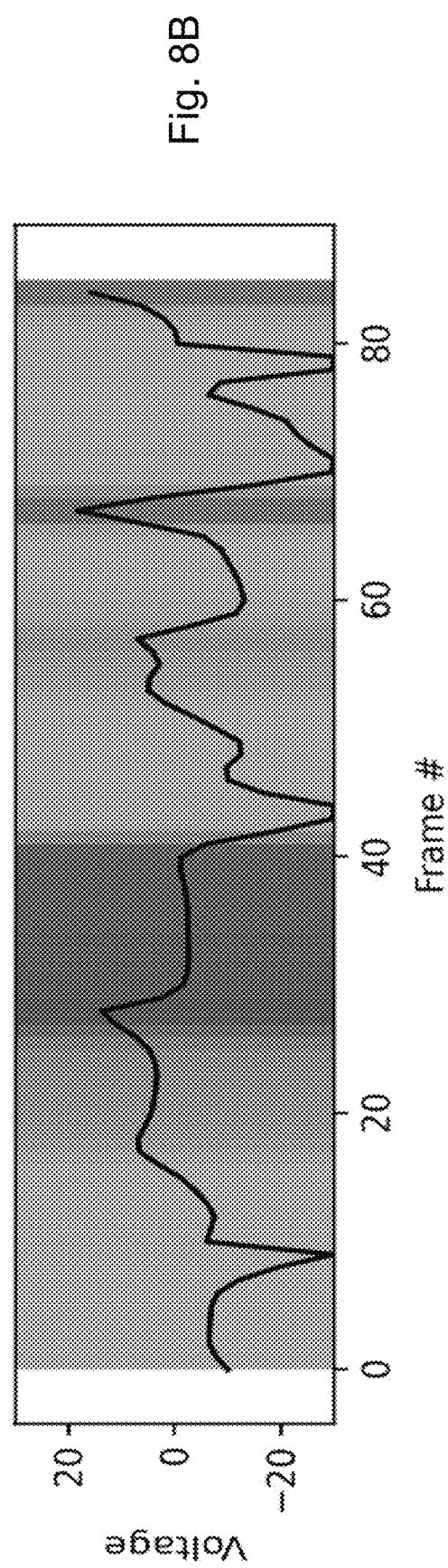
Fig. 8A Predicted Color
Fig. 8B Measured Color

CONTINUOUS WAVEFORM DRIVING IN MULTI-COLOR ELECTROPHORETIC DISPLAYS

CROSS-REFERENCE TO RELATED APPLICATIONS

This application is a division of U.S. patent application Ser. No. 18/326,832, filed May 31, 2023 (Publication No. 2023-0326419), which is a division of U.S. patent application Ser. No. 17/666,013, filed Feb. 7, 2022 (Publication No. 2022-0262323), which claims priority to U.S. Provisional Patent Application No. 63/147,465, filed Feb. 9, 2021. The disclosures of the aforementioned applications, and of all patents, applications, and publications referred to below, are incorporated herein by reference in their entireties.

BACKGROUND OF THE INVENTION

An electrophoretic display (EPD) changes color by modifying the position of a charged colored particle with respect to a light-transmissive viewing surface. Such electrophoretic displays are typically referred to as "electronic paper" or "ePaper" because the resulting display has high contrast and is sunlight-readable, much like ink on paper. Electrophoretic displays have enjoyed widespread adoption in eReaders, such as the AMAZON KINDLE® because the electrophoretic displays provide a book-like reading experience, use little power, and allow a user to carry a library of hundreds of books in a lightweight handheld device.

For many years, electrophoretic displays included only two types of charged color particles, black and white. (To be sure, "color" as used herein includes black and white.) The white particles are often of the light scattering type, and comprise, e.g., titanium dioxide, while the black particle are absorptive across the visible spectrum, and may comprise carbon black, or an absorptive metal oxide, such as copper chromite. In the simplest sense, a black and white electrophoretic display only requires a light-transmissive electrode at the viewing surface, a back electrode, and an electrophoretic medium including oppositely charged white and black particles. When a voltage of one polarity is provided, the white particles move to the viewing surface, and when a voltage of the opposite polarity is provided the black particles move to the viewing surface. If the back electrode includes controllable regions (pixels)—either segmented electrodes or an active matrix of pixel electrodes controlled by transistors—a pattern can be made to appear electronically at the viewing surface. The pattern can be, for example, the text to a book.

More recently, a variety of color options have become commercially available for electrophoretic displays, including three-color displays (black, white, red; black, white, yellow), and four color displays (black, white, red, yellow). Similar to the operation of black and white electrophoretic displays, electrophoretic displays with three or four reflective pigments operate similar to the simple black and white displays because the desired color particle is driven to the viewing surface. The driving schemes are far more complicated than only black and white, but in the end, the optical function of the particles is the same. Additionally, it is noteworthy that such displays can only show a single color at time, i.e., the color of the one set of particles that has been driven to the viewing surface.

Advanced Color electronic Paper (ACeP™) also includes four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta and white particles with respect to the viewing surface will determine the color at each pixel. While this type of electrophoretic display allows for thousands of colors at each pixel, it is critical to carefully control the position of each of the (50 to 500 nanometer-sized) pigments within a working space of about 10 to 20 micrometers in thickness. Obviously, variations in the position of the pigments will result in incorrect colors being displayed at a given pixel. Accordingly, exquisite voltage control is required for such a system. More details of this system are available in the following U.S. Patents, all of which are incorporated by reference in their entireties: U.S. Pat. Nos. 9,361,836, 9,921,451, 10,276,109, 10,353,266, 10,467,984, and 10,593,272.

For the most part, electrophoretic media, such as described above, are designed to be driven with low voltage square waves, such as produced by a driver circuit from a thin-film-transistor backplane. Such driver circuits can be inexpensively mass-produced because they are very closely related to the driving circuitry and fabrication methods that are used to produce liquid crystal display panels, such as found in smart phones, laptop monitors, and televisions. Historically, even when electrophoretic media are driven directly via an isolated electrode (e.g., segmented electrode) the driving pulses are delivered as square waves, having an amplitude and a time width. See, for example, U.S. Pat. No. 7,012,600, incorporated by reference in its entirety. With this form of driving, the electrical impulse, i.e., the amount of time that the charged particles are exposed to a field of a given magnitude determines the final "state" seen at the viewing surface.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven. The term waveform, when used to refer to driving an electrophoretic display is used to describe a series or pattern of voltages provided to an electrophoretic medium over a given time period (seconds, frames, etc.) to produce a desired optical effect in the electrophoretic medium.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:
  (a) Electrophoretic particles, fluids and fluid additives; see for example U.S. Pat. Nos. 7,002,728 and 7,679,814;
  (b) Capsules, binders and encapsulation processes; see for example U.S. Pat. Nos. 6,922,276 and 7,411,719;
  (c) Microcell structures, wall materials, and methods of forming microcells; see for example U.S. Pat. Nos. 7,072,095 and 9,279,906;
  (d) Methods for filling and sealing microcells; see for example U.S. Pat. Nos. 7,144,942 and 7,715,088;
  (e) Films and sub-assemblies containing electro-optic materials; see for example U.S. Pat. Nos. 6,982,178 and 7,839,564;
  (f) Backplanes, adhesive layers and other auxiliary layers and methods used in displays; see for example U.S. Pat. Nos. 7,116,318 and 7,535,624;
  (g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;
  (h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777;
  (i) Applications of displays; see for example U.S. Pat. Nos. 7,312,784 and 8,009,348; and
  (j) Non-electrophoretic displays, as described in U.S. Pat. Nos. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; sec U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively. Additionally, as described in U.S. patent application Ser. No. 17/088,762, encapsulated electrophoretic media can be incorporated into non-planar surfaces that are, in turn, incorporated into everyday objects. As a result, surfaces of products, building materials, etc. can be engineered to change color when a suitable electric field is supplied.

SUMMARY OF THE INVENTION

Disclosed herein are improved methods for driving an electrophoretic medium comprising at least four types of particles, wherein each particle has a different optical property from each other, and each type of particle has a different combination of charge polarity and charge magnitude from each other. One embodiment of such electrophoretic media is known commercially as Advanced Color Electronic Paper or ACEP®, however other suitable electrophoretic media are described herein, and the described methods are generally applicable to four-particle (or more) electrophoretic systems. In one aspect, the method includes providing a continuous driving waveform for at least 500 ms, wherein the continuous driving waveform has at least 16 unique voltage levels during the 500 ms. The resulting waveform results in a transition is less "flashy" or visibly jarring to the viewer. The resulting waveform also allows for controlled transitions, which can be, for example, abrupt, smooth, ramped, or pulsing/oscillating. In one embodiment, the waveform has a rate of change of no more than 3V/ms during the at least 500 ms, while at the same time, the change in the rate of change (second derivative) is between $-1V/ms^2$ and $1V/ms^2$. In one embodiment, the waveform includes at least 32 unique voltage levels during the 500 ms. In one embodiment, the continuous driving waveform lasts at least 1 second. In one embodiment, the at least four types of particles include two particles of a first polarity and two particles of a second polarity. In one embodiment, the at least four types of particles include three particles of a first polarity and one particle of a second polarity. In one embodiment, the optical property is color and the color is selected from the group consisting of white, red, magenta, orange, yellow, green, cyan, blue, violet, and black. In one embodiment, at least two types of particles include surface polymers, and each of the two types of particles has a different kind of surface polymer.

In another aspect a method for driving an electrophoretic medium comprising at least four types of particles, wherein each particle has a different optical property from each other, and each type of particle has a different combination of charge polarity and charge magnitude from each other. The method comprises providing a continuous driving waveform for at least 500 ms, wherein the continuous driving waveform as a function of time is of the form:

$$\lim_{t \to x} V(t) = V(x)$$

during the entirety of the waveform, wherein V(t) is the waveform voltage as function of time and x is a representative value of time, and wherein the waveform includes at least three voltage levels. In one embodiment, the continuous driving waveform lasts at least 1 second. In one embodiment, the at least four types of particles include two particles of a first polarity and two particles of a second polarity. In one embodiment, the at least four types of particles include three particles of a first polarity and one particle of a second polarity. In one embodiment, the optical property is color and the color is selected from the group consisting of white, red, magenta, orange, yellow, green, cyan, blue, violet, and black. In one embodiment, at least two types of particles include surface polymers, and each of the two types of particles has a different kind of surface polymer.

In another aspect, a display system including a first light transmissive electrode, an electrophoretic medium comprising at least four types of particles, wherein each particle has a different optical property from each other, and each type of particle has a different combination of charge polarity and charge magnitude from each other, a second electrode, wherein the electrophoretic medium is disposed between the first light transmissive electrode and the second electrode, a controller, and a power supply operatively connected to the first light transmissive electrode and the second electrode and configured to provide at least 16 unique voltage levels, wherein the controller provides at least three of the unique voltage levels between the first light transmissive electrode and the second electrode when the electrophoretic medium is changed from a first display state to a second display state.

In one embodiment, the power supply provides at least two voltage levels differing by more than 20 Volts. In one embodiment, the at least four types of particles include two particles of a first polarity and two particles of a second polarity. In one embodiment, the at least four types of particles include three particles of a first polarity and one particle of a second polarity. In one embodiment, the optical property is color and the color is selected from the group consisting of white, red, magenta, orange, yellow, green, cyan, blue, violet, and black.

In another aspect, a method for determining a continuous waveform for driving an electrophoretic medium disposed between a first light transmissive electrode and a second electrode, the electrophoretic medium including at least four types of particles, wherein each type of particle has a different optical property from each other, and each type of particle has a different combination of charge polarity and charge magnitude from each other, the method comprising determining a first optical state for the electrophoretic medium, determining a second optical state for the electrophoretic medium, backpropagating iterative driving voltages for a frame width across a desired time span from the second optical state to the first optical state while minimizing a cost function based upon a differentiable surrogate model of the electrophoretic medium between the first light transmissive electrode and the second electrode, and assembling the iterative driving voltages for frame widths to produce a continuous waveform. In some embodiments, the cost function is:

$$\text{cost}(V(t)) = \sum_i \left( \tilde{\mathcal{F}}(V(t), x(0))_i - \text{target}_i \right)^2$$

In some embodiments, the desired time span is at least 500 ms, and the frame widths are less than 50 ms.

In another aspect, a method for determining a continuous waveform for driving an electrophoretic medium disposed between a first light transmissive electrode and a second electrode, the electrophoretic medium including at least four types of particles, wherein each type of particle has a different optical property from each other, and each type of particle has a different combination of charge polarity and charge magnitude from each other, the method comprising determining a first optical state for the electrophoretic medium, determining a second optical state for the electrophoretic medium, backpropagating iterative driving voltages for a frame width across a desired time span from the second optical state to the first optical state, wherein a transition between frames does not involve a voltage change of more than +40V, and assembling the iterative driving voltages to produce a continuous waveform. In one embodiment, the continuous waveform between the first optical state and the second optical state does not have a change in the rate of change of voltage as a function of time that is less than $-1V/ms^2$ or greater than $1V/ms^2$.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 3A illustrates the preferred position of each of the four sets of particles to produce eight standard colors in a white-cyan-magenta-yellow (WCMY) four-particle electrophoretic display, wherein the white particles are reflective and the cyan, magenta, and yellow particles are absorptive.

FIG. 3B illustrates the preferred position of each of the four sets of particles to produce eight standard colors in a black-red-yellow-blue (KRYB) four-particle electrophoretic display, wherein the black particles are absorptive, and the red, yellow, and blue particles are reflective.

FIG. 6A illustrates a predicted color transition from a first color state to a second color state as a function of a continuous voltage delivered over a number of frames in a WCMY EPD system, and FIG. 6B shows the experimental results of providing the predicted waveform to the system.

FIG. 8A illustrates a predicted color transition from a first color state to a second color state as a function of a continuous voltage delivered over a number of frames in a WCMY EPD system, and FIG. 8B shows the experimental results of providing the predicted waveform to the system.

DETAILED DESCRIPTION OF THE INVENTION

Figure 1A:
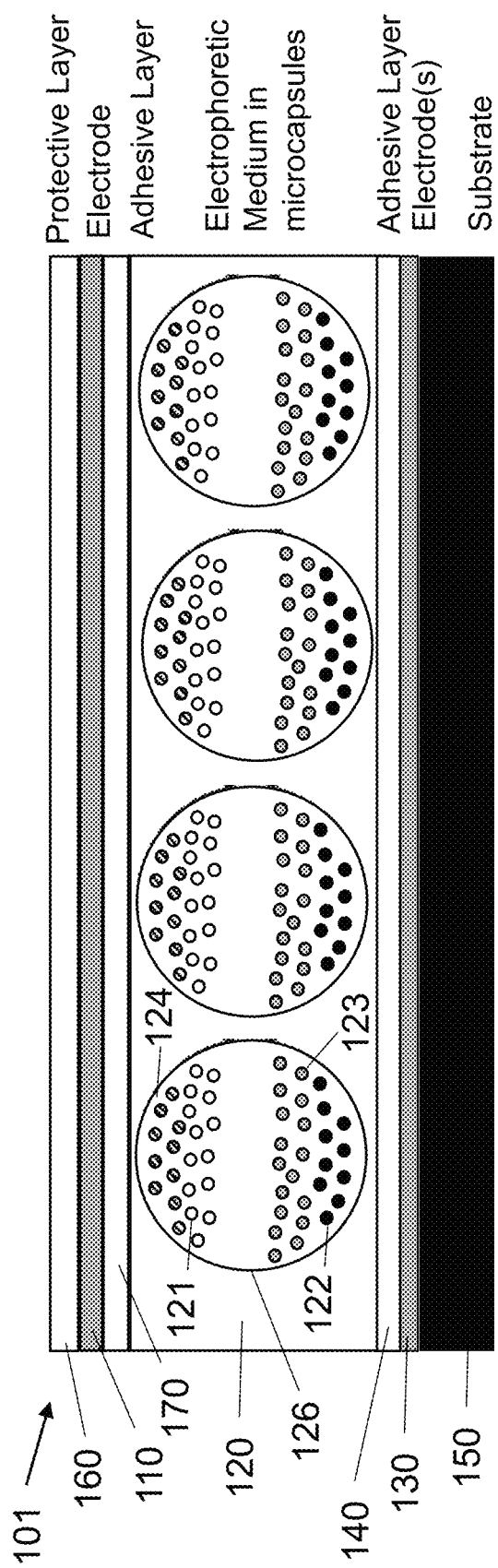
FIG. 1A is a representative cross-section of a four-particle electrophoretic display wherein the electrophoretic medium is encapsulated in capsules.

The invention details methods for identifying enhanced continuous waveforms for driving a multi-particle color electrophoretic medium having at least four different electrophoretic particle sets, for example, wherein at least three of the particle sets are colored and subtractive and at least one of the particles is scattering/reflective, or when at least three of the particle sets are colored and reflective and at least one of the particles is subtractive. Typically, such a systems include a reflective white particle and cyan, yellow, and magenta subtractive primary colored particles, or red, yellow, and blue reflective particles and an absorptive black particle. Of course, alternative color choices can be used provided that suitable primary colors are chosen. Additionally, the methods of developing continuous waveforms for driving such multi-particle systems are applicable to electrophoretic display systems including more types of particles, such as five particle, six particle, seven particle, and eight particle systems.

Continuous voltage waveforms have the unique characteristic of having tunable transition appearance in a way that traditional push-pull or square pulse-based waveforms do not. This is of particular importance to applications in which a controller which has many voltage levels available (high bit depth) and where transition appearance and final color are of utmost importance. The access to the trace colors within the model allows for incorporation of complex, differentiable cost related to color state.

Methods for fabricating an electrophoretic display including four (or more) particles have been discussed in the prior art. The electrophoretic fluid may be encapsulated in microcapsules or incorporated into microcell structures that are thereafter sealed with a polymeric layer. The microcapsule or microcell layers may be coated or laminated to a plastic substrate or film bearing a transparent coating of an electrically conductive material. Alternatively, the microcapsules may be coated onto a light transmissive substrate or other electrode material using spraying techniques. (See U.S. Pat. No. 9,835,925, incorporated by reference herein). The resulting assembly may be laminated to a backplane bearing pixel electrodes using an electrically conductive adhesive. The assembly may alternatively be attached to one or more segmented electrodes on a backplane, wherein the segmented electrodes are driven directly. In another embodiment the assembly, which may include a non-planar light transmissive electrode material is spray coated with capsules and then overcoated with a back electrode material. (See U.S. patent application, Ser. No. 17/088,762). Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

Electrophoretic media used herein include charged particles that vary in color, reflective or absorptive properties, charge density, and mobility in an electric field (measured as a zeta potential). A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention. For example, the electrophoretic medium might include a fluid, a plurality of first and a plurality of second particles dispersed in the fluid, the first and second particles bearing charges of opposite polarity, the first particle being a light-scattering particle and the second particle having one of the subtractive primary colors, and a plurality of third and a plurality of fourth particles dispersed in the fluid, the third and fourth particles bearing charges of opposite polarity, the third and fourth particles each having a subtractive primary color different from each other and from the second particles, wherein the electric field required to separate an aggregate formed by the third and the fourth particles is greater than that required to separate an aggregate formed from any other two types of particles.

The electrophoretic media of the present invention may contain any of the additives used in prior art electrophoretic media as described for example in the E Ink and MIT patents and applications mentioned above. Thus, for example, the electrophoretic medium of the present invention will typically comprise at least one charge control agent to control the charge on the various particles, and the fluid may have dissolved or dispersed therein a polymer having a number average molecular weight in excess of about 20,000 and being essentially non-absorbing on the particles to improves the bistability of the display, as described in the aforementioned U.S. Pat. No. 7,170,670.

In one embodiment, the present invention uses a light-scattering particle, typically white, and three substantially non-light-scattering particles. There is of course no such thing as a completely light-scattering particle or a completely non-light-scattering particle, and the minimum degree of light scattering of the light-scattering particle, and the maximum tolerable degree of light scattering tolerable in the substantially non-light-scattering particles, used in the electrophoretic of the present invention may vary somewhat depending upon factors such as the exact pigments used, their colors and the ability of the user or application to tolerate some deviation from ideal desired colors. The scattering and absorption characteristics of a pigment may be assessed by measurement of the diffuse reflectance of a sample of the pigment dispersed in an appropriate matrix or liquid against white and dark backgrounds. Results from such measurements can be interpreted according to a number of models that are well-known in the art, for example, the one-dimensional Kubelka-Munk treatment. In the present invention, it is preferred that the white pigment exhibit a diffuse reflectance at 550 nm, measured over a black background, of at least 5% when the pigment is approximately isotropically distributed at 15% by volume in a layer of thickness 1 μm comprising the pigment and a liquid of refractive index less than 1.55. The yellow, magenta and cyan pigments preferably exhibit diffuse reflectances at 650, 650 and 450 nm, respectively, measured over a black background, of less than 2.5% under the same conditions. (The wavelengths chosen above for measurement of the yellow, magenta and cyan pigments correspond to spectral regions of minimal absorption by these pigments.) Colored pigments meeting these criteria are hereinafter referred to as "non-scattering" or "substantially non-light-scattering". Specific examples of suitable particles are disclosed in U.S. Pat. Nos. 9,921,451, which is incorporated by reference herein.

Alternative particle sets may also be used, including four sets of reflective particles, or one absorptive particle with three or four sets of different reflective particles, i.e., such as described in U.S. Pat. Nos. 9,922,603 and 10,032,419, which are incorporated by reference herein. For example, white particles may be formed from an inorganic pigment, such as $TiO_2$, $ZrO_2$, $ZnO$, $Al_2O_3$, $Sb_2O_3$, $BaSO_4$, $PbSO_4$ or the like, while black particles may be formed from CI pigment black 26 or 28 or the like (e.g., manganese ferrite black spinel or copper chromite black spinel) or carbon black. The third/fourth/fifth type of particles may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

Figure 1B:
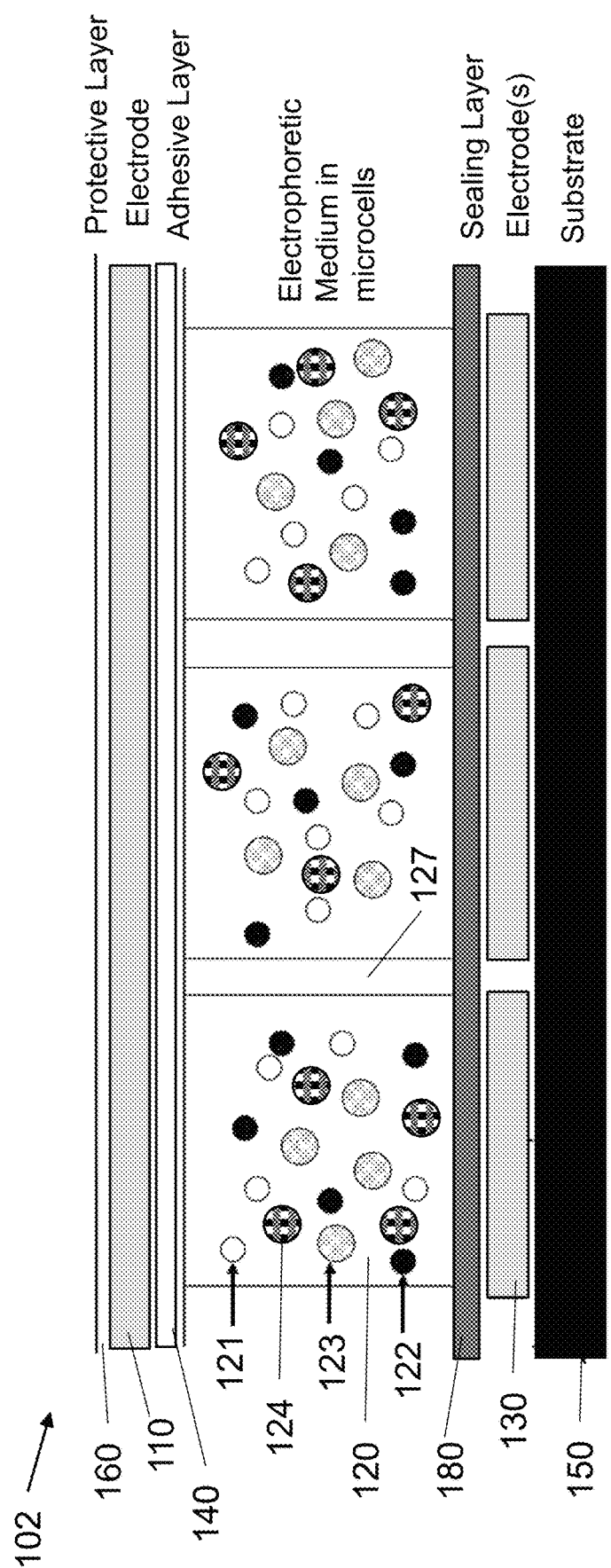
FIG. 1B is a representative cross-section of a four-particle electrophoretic display wherein the electrophoretic medium is encapsulated in microcells.

As shown in FIG. 1A and FIG. 1B, an electrophoretic display (101, 102) typically includes a top transparent electrode 110, an electrophoretic medium 120, and a bottom electrode 130, which is often a pixel electrode of an active matrix of pixels controlled with thin film transistors (TFT). However, and especially with respect to displays of the invention, the bottom electrode 130 can be a singular larger electrode, such as a graphite backplane, a film of PET/ITO, a metalized film, or a conductive paint. In the electrophoretic media 120 described herein, there are four different types of particles, 121, 122, 123, and 124, however more particle sets can be used with the methods and displays described herein. The electrophoretic medium 120 is typically compartmentalized such by a microcapsule 126 or the walls of a microcell 127. An optional adhesive layer 140 can be disposed adjacent any of the layers, however, it is typically adjacent an electrode layer (110 or 130). There may be more than one adhesive layer 140 in a given electrophoretic display (105, 106), however only one layer is more common. The entire display stack is typically disposed on a substrate 150, which may be rigid or flexible. The display (101, 102) typically also includes a protective layer 160, which may simply protect the top electrode 110 from damage, or it may envelop the entire display (101, 102) to prevent ingress of water, etc. Electrophoretic displays (101, 102) may also include sealing layers 180 as needed. In some embodiments the adhesive layer 140 may include a primer component to improve adhesion to the electrode layer 110, or a separate primer layer (not shown in FIG. 1B) may be used. The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.

In some embodiments, e.g., as shown in FIG. 1A, the electrophoretic display may include only a first light-transmissive electrode, an electrophoretic medium, and a second (rear) electrode, which may also be light-transmissive. However to produce a high-resolution display, e.g., for displaying images, individual pixels are used to control the colors across the image. Of course, each pixel must be addressable without interference from adjacent pixels so that an image file is faithfully reproduced in the display. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner. The time between addressing in the display is known as a "frame." Thus, a display that is updated at 60 Hz has frames that are 16 msec.

Frames are not limited to use with an active matrix backplane, however, and many driving waveforms described herein are described with reference to a frame as a unit of time. While it is possible to drive electrophoretic media with an analog voltage signal, such as produced by a power supply and a potentiometer, the use of a digital controller discretizes the waveform into blocks that are typically on the order of 10 ms, however shorter or longer frame widths are possible. For example, a frame can be 0.5 ms, or greater, such as 1 ms, 5 ms, 10 ms, 15 ms, 20 ms, 30 ms, or 50 ms. In most instances a frame is less than 100 ms, such 250 ms, 200 ms, 150 ms, or 100 ms. In most applications described herein, the frame is between 10 ms and 30 ms in width. Suitable controllers are available from, e.g., Digi-Key and other electronics components suppliers.

In a conventional electrophoretic display using an active matrix backplane, each pixel electrode has associated therewith a capacitor electrode (storage capacitor) such that the pixel electrode and the capacitor electrode form a capacitor; see, for example, Published International Patent Application No. WO 2001/007961. In some embodiments, N-type semiconductor (e.g., amorphous silicon) may be used to from the transistors and the "select" and "non-select" voltages applied to the gate electrodes can be positive and negative, respectively.

Figure 2A:
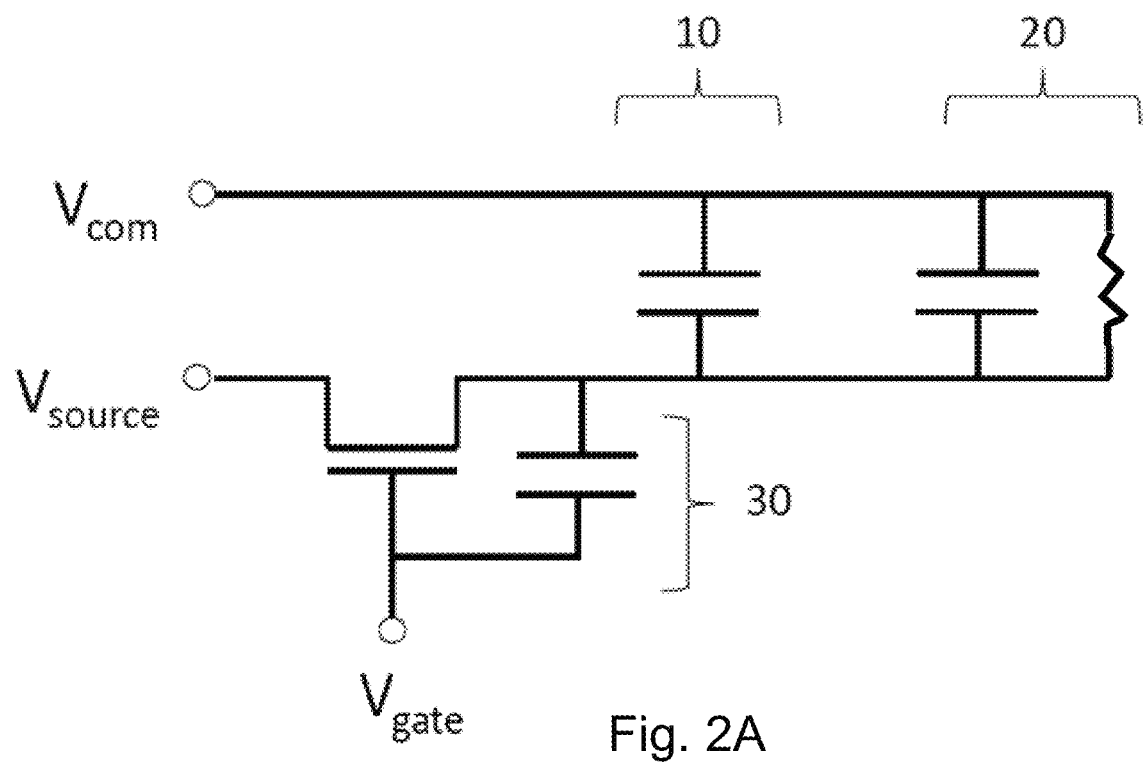
FIG. 2A illustrates an exemplary equivalent circuit of a single pixel of an electrophoretic display that uses an active matrix backplane with a storage capacitor.

FIG. 2A of the accompanying drawings depicts an exemplary equivalent circuit of a single pixel of an electrophoretic display. As illustrated, the circuit includes a capacitor 10 formed between a pixel electrode and a capacitor electrode. The electrophoretic medium 20 is represented as a capacitor and a resistor in parallel. In some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. [In some embodiments, to compensate for the unwanted "kickback voltage", a common potential $V_{com}$, may be supplied to the top plane electrode and the capacitor electrode associated with each pixel, such that, when $V_{com}$ is set to a value equal to the kickback voltage ($V_{KB}$), every voltage supplied to the display may be offset by the same amount, and no net DC-imbalance experienced.] It has been found that driving waveforms to sort the pigments of a four-particle system into appropriate configurations to make these colors need at least five voltage levels (high positive, low positive, zero, low negative, high negative). For greater details, see U.S. patent application Ser. No. 17/088,762. However, as described below, when a continuous range of voltage levels (or a near approximation) is used to drive such a four-particle system, a much wider varieties of colors and color transitions is achievable.

Figure 2B:
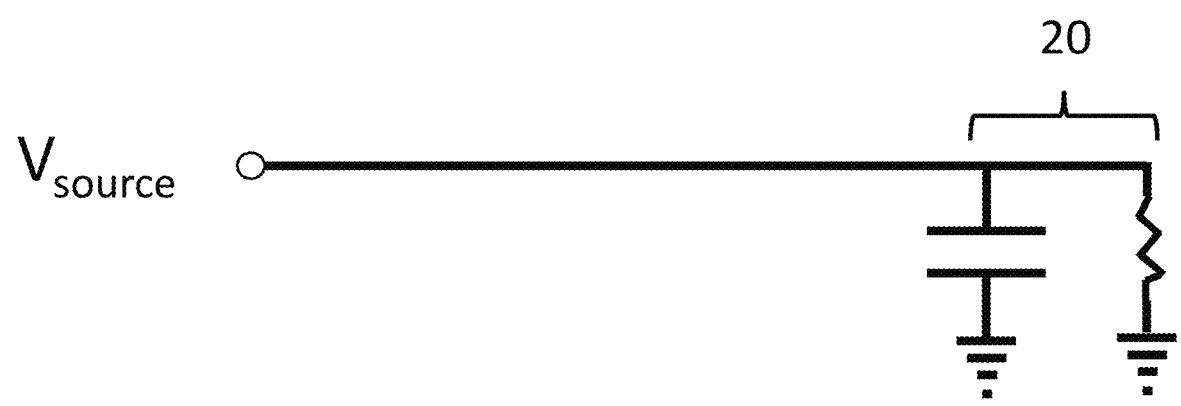
FIG. 2B illustrates an exemplary equivalent circuit of a simplified electrophoretic display of the invention, wherein a power supply is configured to provide many voltage levels.

The equivalent circuit of FIG. 2A represents the "typical" way to drive four-particle electrophoretic systems, especially when used to display high-resolution images, such as photos and text. However, it is also possible to drive an electrophoretic medium with a simpler equivalent circuit, such as shown in FIG. 2B. This simple circuit represents merely a voltage source coupled to a first electrode adjacent to the electrophoretic medium and a second electrode, on the other side of the electrophoretic medium that is grounded. If the voltage source is capable of providing any arbitrary voltage waveform, this simple circuit can produce any possible display color, as well as any possible transition between display colors. Like FIG. 2A, the electrophoretic medium 20, itself can be represented as a capacitor and resistor, in parallel. Of course, the second electrode does not have to be grounded, per se, but it may be set at an arbitrary voltage level. A suitable voltage, capable of providing an arbitrary waveform can be obtained from Tektronix, however in many cases it is more cost effective to combine a power supply with a digital controller.

As shown in FIG. 3A, in the instance of a four-particle system including subtractive cyan, yellow, and magenta particles paired with a reflective white particle, each of the eight principal colors (red, green, blue, cyan magenta, yellow, black and white) corresponds to a different arrangement of the four pigments. The three particles providing the three subtractive primary colors, e.g., for an Advanced Color electronic Paper (ACeP) display, may be substantially non-light-scattering ("SNLS"). The use of SNLS particles allows mixing of colors and provides for more color outcomes than can be achieved with the same number of scattering particles. These thresholds must be sufficiently separated relative to the voltage driving levels for avoidance of cross-talk between particles, and this separation necessitates the use of high addressing voltages for some colors. In addition, addressing the colored particle with the highest threshold also moves all the other colored particles, and these other particles must subsequently be switched to their desired positions at lower voltages.

As shown in FIG. 3A, the system in principle works similar to printing on bright white paper in that the viewer only sees those colored pigments that are on the viewing side of the white pigment (i.e., the only pigment that scatters light). In FIG. 3A, it is assumed that the viewing surface of the display is at the top (as illustrated), i.e., a user views the display from this direction, and light is incident from this direction. As already noted, in preferred embodiments only one of the four particles used in the electrophoretic medium of the present invention substantially scatters light, and in FIG. 3A this particle is assumed to be the white pigment. This light-scattering white particle forms a white reflector against which any particles above the white particles (as illustrated in FIG. 3A) are viewed. Light entering the viewing surface of the display passes through these particles, is reflected from the white particles, passes back through these particles and emerges from the display. Thus, the particles above the white particles may absorb various colors and the color appearing to the user is that resulting from the combination of particles above the white particles. Any particles disposed below (behind from the user's point of view) the white particles are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 3A), there are no particles above the white particles and the pixel simply displays a white color. When a single particle is above the white particles, the color of that single particle is displayed, yellow, magenta and cyan in Situations [B], [D] and [F] respectively in FIG. 3A. When two particles lie above the white particles, the color displayed is a combination of those of these two particles; in FIG. 3A, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 3A), all the incoming light is absorbed by the three subtractive primary colored particles and the pixel displays a black color.

An alternative particle set using reflective color particles is shown in FIG. 3B. In the embodiment of FIG. 3B, the reflective particles are red, yellow, and blue, however alternative color sets could be used provided that the combination of colors suitably spanned the useful color spectrum. In the system of FIG. 3B, the color viewed at the surface is due to direct reflection of the colored particles, and a layer of absorptive black is typically placed between the display particles and the particles that are not to be displayed in an attempt to keep the colors as true as possible. Because a viewer is looking at light that is predominantly only interacting with one pigment surface, images produced with a system of FIG. 3B appear more saturated. However the overall gamut of colors using a system of FIG. 3B is diminished because it is difficult to achieve fine control of the amount of specific particles that are mixed together to create secondary colors (e.g., orange, green, violet). In applications such as digital signage, the saturation is often more important than the color gamut, and many users are satisfied with a set of eight "standard" colors.

Different combinations of light scattering and light absorbing particle sets are also possible. For example, one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black). Of course, it would not be easy to render the color black if more than one type of colored particle scattered light without the presence of an absorptive black particle.

FIGS. 3A and 3B show idealized situations in which the colors are uncontaminated (i.e., the light-scattering white particles completely mask any particles lying behind the white particles in FIG. 3A, or the light-absorbing black particles shield the light scattering particles that should not be visible in FIG. 3B). In practice, the masking by the white particles may be imperfect so that there may be some small absorption of light by a particle that ideally would be completely masked. Such contamination typically reduces both the lightness and the chroma of the color being rendered. In the instance of FIG. 3B, the presence of the light-absorbing particles often causes the overall image to look darker due to imperfect scattering of the reflective particles. Additionally, because it is difficult to engineer pigments that are spaced apart exactly equidistant on the chromatic spectrum, the combined colors in FIG. 3B, such as orange, green, and violet, may not achieve the colors that are desired. This is particularly problematic for greens because the human eye is very sensitive to different shades of green, whereas different shades of red are not as noticeable. In some embodiments, this can be corrected with the inclusion of additional particles with different steric or charge characteristics, e.g., a green scattering particle, however adding additional particles complicates the drive scheme and may require a wider range of driving voltages. Obviously, in the electrophoretic media described herein, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above.

Waveforms for driving four-particle electrophoretic media have been described previously, but they are quite different from the waveforms of the invention. A set of waveforms for driving a color electrophoretic display having four particles is described in U.S. Pat. No. 9,921,451, incorporated by reference herein. Most commercial electrophoretic displays use amorphous silicon based thin-film transistors (TFTs) in the construction of active matrix backplanes (202/024) because of the wider availability of fabrication facilities and the costs of the various starting materials. Amorphous silicon thin-film transistors become unstable when supplied gate voltages that would allow switching of voltages higher than about +/−15V. Accordingly, as described in previous patents/applications on such systems, improved performance is achieved by additionally changing the bias of the top light-transmissive electrode with respect to the bias on the backplane pixel electrodes, a technique known as top-plane switching. Thus, if a voltage of +30V (relative to the backplane) is needed, the top plane may be switched to −15V while the appropriate backplane pixel is switched to +15V. Methods for driving a four-particle electrophoretic system with top-plane switching are described in greater detail in, for example, U.S. Pat. No. 9,921,451.

Figure 4A:
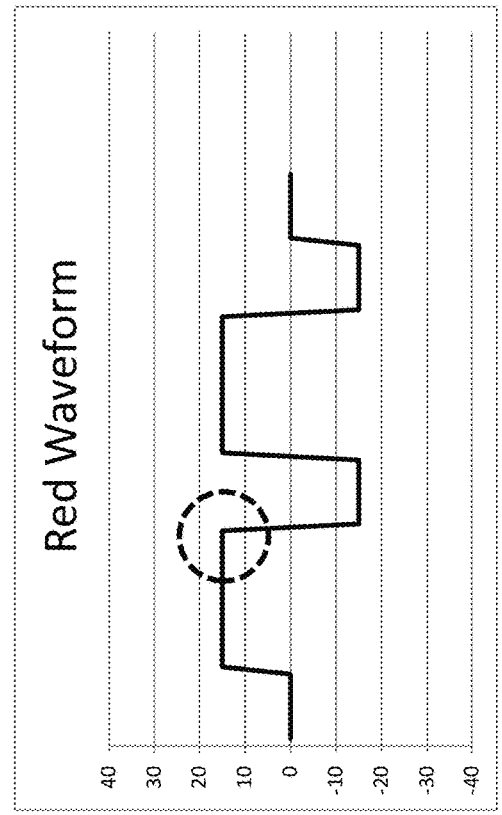
FIGS. 4A and 4B show (prior art) simple push-pull waveforms that can be used to achieve specific colors in an EPD system including one reflective (white) particle, and three subtractive (cyan, yellow, magenta) particles.
Figure 4B:
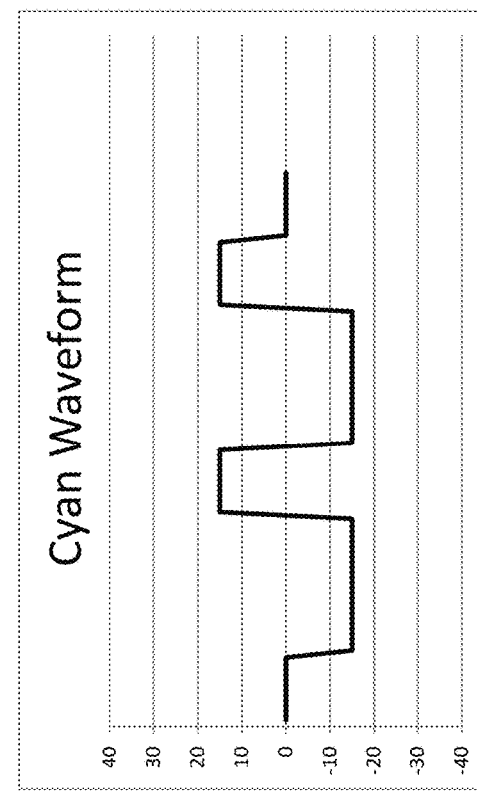

In prior embodiments of the Advanced Color electronic Paper (ACeP), the waveform (voltage against time curve) applied to the pixel electrode of the backplane of a display of the invention is described and plotted, while the front electrode is assumed to be grounded (i.e., at zero potential). The electric field experienced by the electrophoretic medium is of course determined by the difference in potential between the backplane and the front electrode and the distance separating them. The display is typically viewed through its front electrode, so that it is the particles adjacent the front electrode which control the color displayed by the pixel, and if it is sometimes easier to understand the optical transitions involved if the potential of the front electrode relative to the backplane is considered; this can be done simply by inverting the waveforms discussed below. Two exemplary waveforms of this type are shown in FIGS. 4A and 4B, which are equivalent to FIGS. 7A and 7B of U.S. Pat. No. 9,921,451. Notably, these types of "push-pull" waveforms are not continuous in terms of the common mathematical definition of continuous. That is, when the waveform flips from push to pull (see dotted circle) the waveform does not satisfy the expression of equation 1:

$$\lim_{t \to x} V(t) = V(x) \qquad (1)$$

wherein V(t) is the waveform voltage as function of time and x is a representative value of time. Because frames are the unit of time, the time axis can be replaced with frame number, as has been done in FIGS. 4A and 4B. To some degree, the shape of push-pull waveforms is an artifact of the physical structures that are used to drive the electrophoretic medium. That is, because AM-TFTs only provide a limited range of driving voltages, the waveforms must be constructed within those constraints. While a great deal of effort has gone into optimizing such waveforms, they are often visibly jarring because of the abrupt switches in voltage polarity.

Figure 5A:
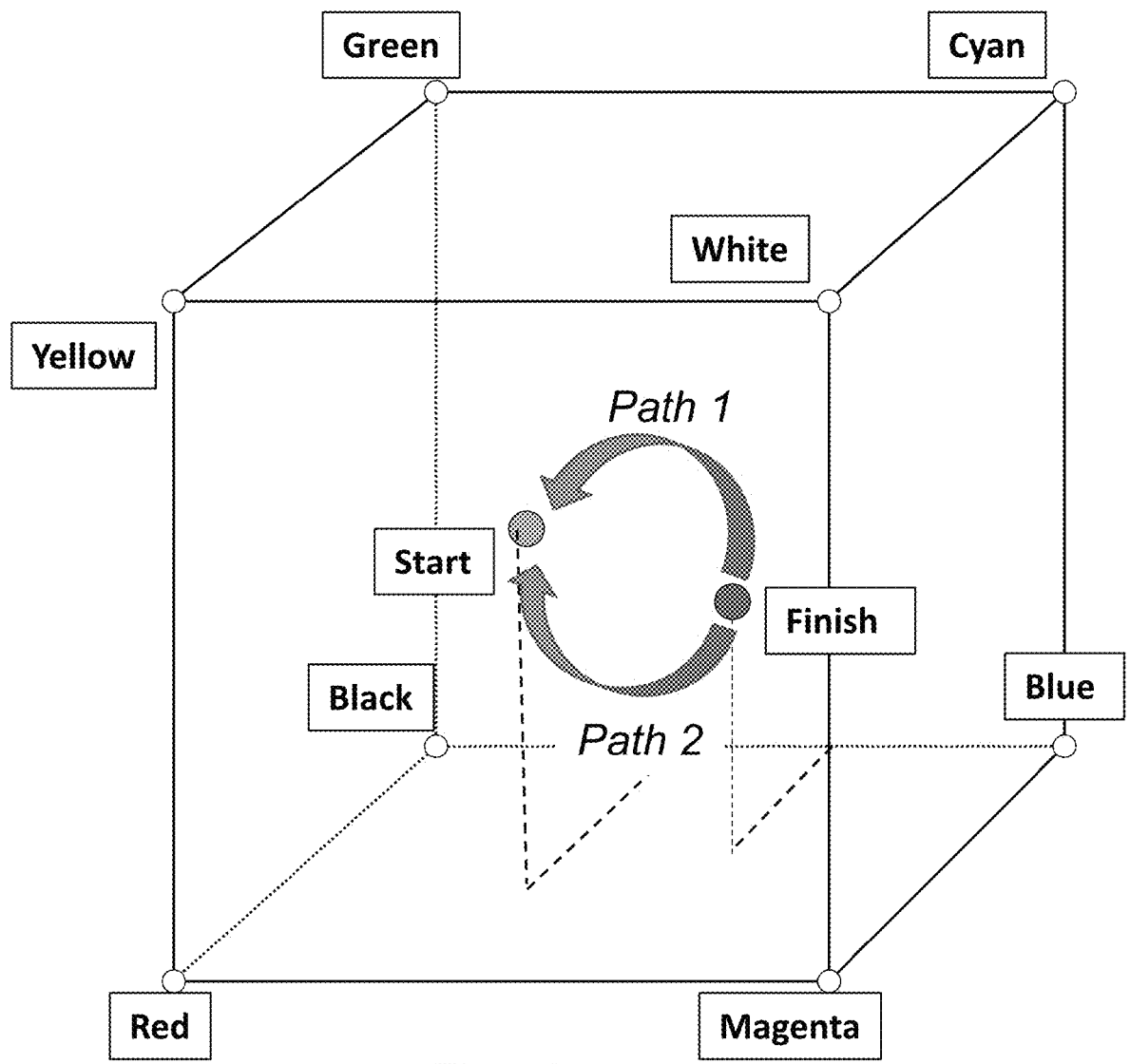
FIG. 5A illustrates a color space that can be defined for a four-particle electrophoretic system and how a transition from a first color to a second color may proceed along more than one pathway.

Theoretically, there is no reason that discontinuous driving waveforms must be used. In particular, when there is independent control of the voltage across the medium (see FIG. 2A), and there are fewer constraints on the number of voltage levels and the length of the update, there are virtually an unlimited number of different ways to progress from a first color to a second color. As a consequence, it is possible to choose specific transitions "looks", for example very slow transitions, very sharp transitions, or transitions that oscillate between colors or build up to a specific color. As shown in FIG. 5A full-color space can be obtained with a four-particle system including a reflective white particles and cyan, yellow, and magenta subtractive particles. For standardization, the vertices of this color space, corresponding to FIG. 3A, have been labeled with RGB values typically used, i.e., [255,0,0], [0,255,0], [0,0,255], [0,255,255], [255, 0,255], [255, 255,0], [255,255,255] and [0,0,0]. Accordingly, any color transition from a first color to a second color can be visualized as some path from start to finish within this color space, i.e., as shown in FIG. 5A.

Figure 5B:
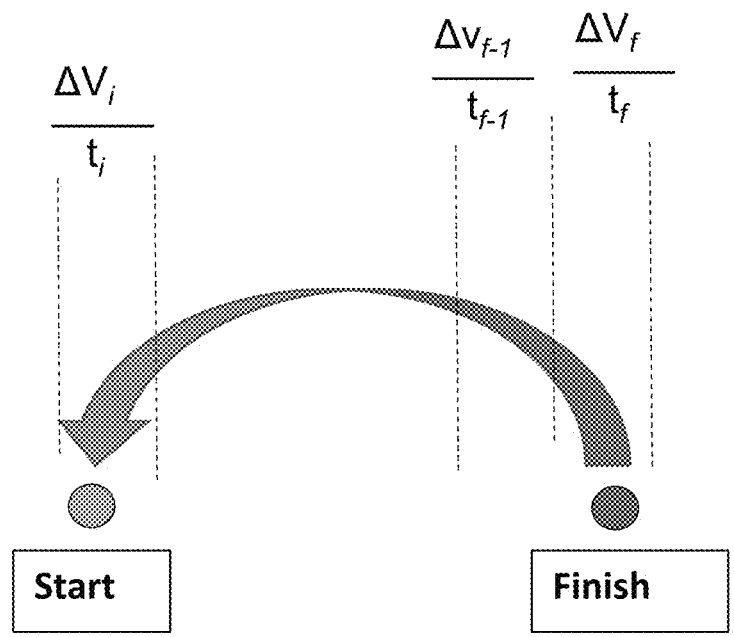
FIG. 5B illustrates how a waveform can be backpropagated iteratively from a second optical state to a first optical state, and then assembled to produce a preferred waveform.

The voltage response of the display is ultimately a function $\bar{f}$ of the type of electrophoretic medium, the capacitance and resistance of the electrophoretic stack (see FIG. 2A) and various other external functions such as ambient temperature and the spectrum of the incident light. If the color space is completely described by $\bar{f}$, a novel waveform can be constructed along one or more paths between the first and second color states as shown in FIG. 5A. Furthermore, a continuous voltage waveform can be derived by interrogating the derivatives of $\bar{f}$ and backpropagating from the target color back to the starting color, as shown in FIG. 5B. This step can be described mathematically via the problem statement below:

$$\underset{V(t)}{\mathrm{argmin}}\ \mathrm{cost}(\bar{f}(V(t), x(0)), \mathrm{target}), \text{ s.t. } V(t) < V_{max}\ \&\&\ V(t) > V_{min} \quad (2)$$

Of course, there are many solutions to equation (2), some of which are very expensive (time of update or wear on the system), and some that do not reflect the physical reality of the ultimate display. The goal is to identify the waveforms that achieve the target optical state with an acceptable number of flashes, length of time, etc. This is a difficult optimization problem as the inversion process is not symmetric; for every V(t) there is a unique optical state, but for every optical state there are multiple/infinite input voltage lists. The inverse problem, namely from desired optical state to voltage list (i.e., waveform), is described here in the context of continuous voltage waveforms.

$$\mathrm{cost}(V(t)) = \mathrm{cost}(\bar{f}(V(t), x(0)), \mathrm{target}) \quad (3)$$

$$\mathrm{cost}(V(t)) = \sum_i (\bar{f}(V(t), x(0))_i - \mathrm{target}_i)^2 \quad (4)$$

The cost function of equation (4) represents the Euclidean distance between the target color and the output color of the model $\bar{f}$ as a function of the input voltage list V(t) in an arbitrarily high-dimensional space, where i is the output dimension. This can be utilized to compute the partial derivatives like so:

$$\frac{\partial \mathrm{cost}}{\partial V_i} = \frac{\partial \mathrm{cost}}{\partial f} \frac{\partial \bar{f}}{\partial V_i} \quad (5)$$

$$\frac{\partial \mathrm{cost}}{\partial V_i} = \left(\sum_i -2(\bar{f}(V(t), x(0))_i - \mathrm{target}_i)\right) * \frac{\partial \bar{f}}{\partial V_i} \quad (6)$$

where $\partial V_i$ represents the partial derivative with respect to the ith frame in the list. This partial derivative can be used to compute the update to the voltage in $V_i$ in an iterative manner until convergence. This process leads to a local minimum which creates a waveform that utilizes any voltage within a range. Boundary conditions can be imposed by preventing a voltage from being updated to be beyond the predefined $V_{max}$ or $V_{min}$. As described herein, the swing between $V_{max}$ to $V_{min}$ is typically 50V, but it could be higher. As with any ill-posed inverse problem that requires inversion of a many-to-one mapping, the initial condition becomes a point of sensitivity. For this reason the process is parallelized by starting with many different random initial positions (in this case different V(t)) and applying the gradient descent process to each of these signals to generate many candidate waveforms for human or algorithmic down selection downstream.

Ultimately, the waveform needs to be parsed into frames for digital storage and execution, e.g., by a voltage controller. While the waveform can be arbitrarily long, it is typically on the order of 500 ms to 5 seconds, for example 1 second. Depending upon the desired time frame for the transition, the size of the frames can be adjusted suitably. For use on a controller, these voltages can be discretized to match the bit depth available, though practically this method is meant for applications in which the bit depth provided is enough to remove large quantization artifacts, i.e. >8 bits. In most cases, however, a bit depth of 4 (16 voltage levels) is sufficient, while 32 or more voltage levels improves the correlation between the calculated and actual final color state. As the current through the device is given by $$I \propto C \frac{dV(t)}{dt},$$

the controller should be able to support the current at the frequencies demanded by the waveform for the display being driven. For most applications, it is sufficient for the rate of change to be less than 3V/ms. Additionally, to achieve smooth transitions, it is preferred for the rate of change in the update rate (i.e., the second derivative of the function) to be between $-1V/ms^2$ and $1V/ms^2$, that is, not less than $-1V/ms^2$, and not greater than $1V/ms^2$.

A preferred way to build the function of the color space is to use a differentiable model that is a surrogate representing the final display construction. A specific electrophoretic display construction can be represented by a transfer function. In its simplest form:

$$o(t) = f(V(t), x(0)) \quad (7)$$

where O(t) is the optical state as a function of time and f is a function of the voltage applied to the display as a function of time, given some initial state of the system at t=0 (x(0)). Additional inputs can be specified here, including but not limited to temperature, relative humidity, and incident light spectrum. The function f can be estimated using a variety of means, for example an ab initio model built from component measurements. Suitable models can be constructed relatively inexpensively, however, the accuracy of the function will depend upon the ability to account for non-linear interactions between the particle sets as well as capsule- or microcell-wall-particle interactions. In some embodiments, it is sufficient to pick arbitrary operating conditions such as 20° C. and 50% relative humidity with illumination by a simulated spectrum from the sun. However, as the application for the electrophoretic medium deviates from such ideal conditions, the value of the model is diminished. Additionally, for the surrogate model to be differentiable, it has to be a continuous (and reversible) function of voltage and time. However, it has been found in some four particle systems that hysteresis exists, but if the hysteresis is not too severe, it may be sufficient to merely average the backward and forward pathways to achieve the function f.

EXAMPLES

Figure 7A:
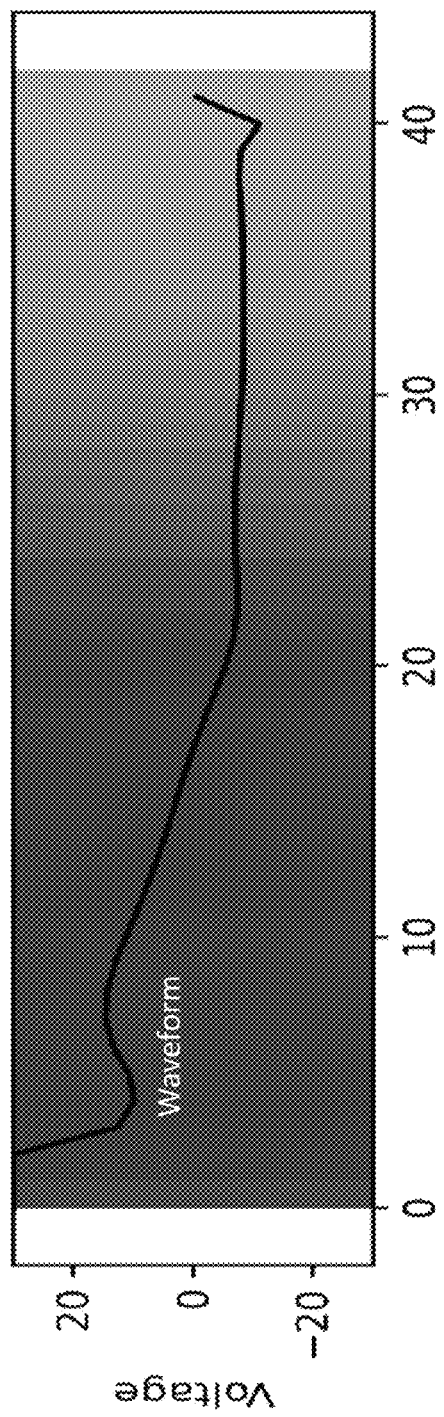
FIG. 7A illustrates a predicted color transition from a first color state to a second color state as a function of a continuous voltage delivered over a number of frames in a WCMY EPD system.

Examples of the continuous voltage waveforms are shown in FIGS. 6A, 6B, 7A, 7B, 8A, and 8B. A microencapsulated electrophoretic medium including a reflective white particle and three subtractive (C,M,Y) particles was disposed between a layer of PET-ITO and a graphite backplane on glass. The top and bottom electrodes were coupled to a specialty controller (LUCY™ controller, E Ink Corporation), that can be programmed via computer and produces at least 256 unique voltage levels between 0 and 50V. The display was mounted on the workbench of a spectrophotometric optical measurement device of the type described in the literature. (See D. Hertel, "Application of the Optical Measurement Methodologies of IEC and ISO Standards to Reflective E-Paper Displays," Society for Information Display, International Symposium Digest of Technical Papers, Volume 49, issue 1, pages 161-164 (May 2018), incorporated by reference herein.) A series of measurements were used to build a training model that was ultimately built up sufficiently to predict display colors for specific waveforms, as shown in FIGS. 6A, 7A, and 8A. The image drive panels of FIGS. 6A, 6B, 7A, 7B, 8A, and 8B roughly show the observed color state (FIGS. 6B, 7B, 8B) at each frame and the progression from a first state (frame 0) to a second state (frame 85) as a function of the frame number. Because the total waveform was two seconds, each frame is roughly 20 µs. The actual waveform is represented as the dark line. In FIG. 6B, the cyan, magenta, and yellow lines indicate the relative positions of those colored particle sets with respect to the viewing side of the display (see FIG. 3A). In effect the "voltage" value for the cyan, magenta, and yellow lines represents relative position between the top (viewing) electrode and the opposed electrode below the electrophoretic medium. Large positive voltage is closer to the viewing surface while large negative voltage is furthest away from the viewing surface. The cyan, magenta, and yellow lines are not waveforms.

Figure 7B:
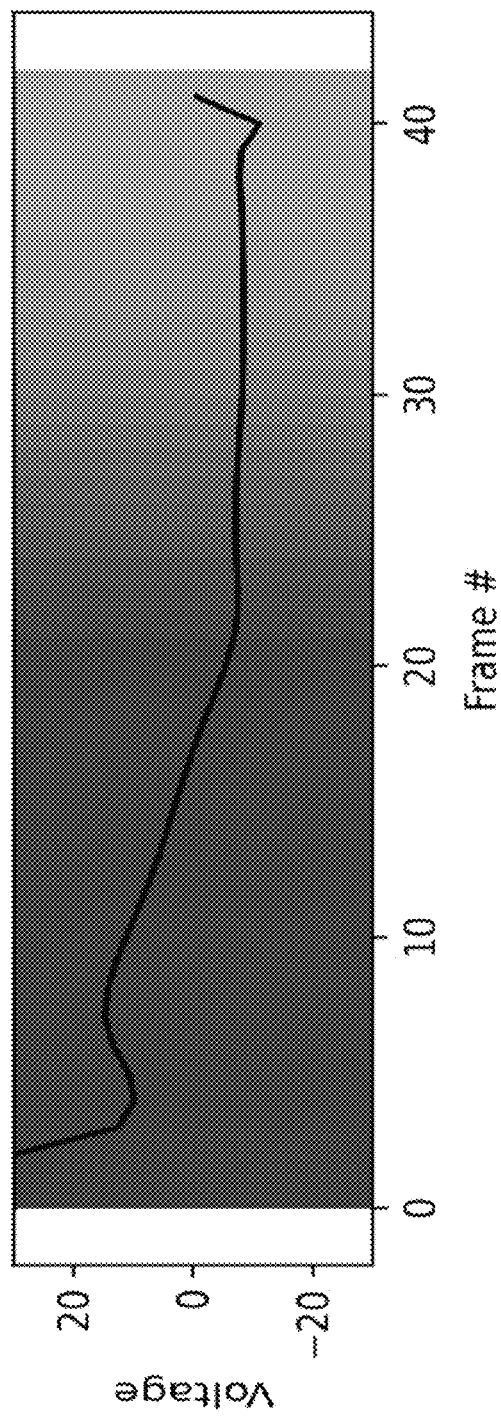
FIG. 7B shows the experimental results of providing the predicted waveform to the system.

As shown in the measured traces, 6B, 7B, 8B, when the predicted waveforms were executed on the actual display, the final state was (roughly) achieved in each instance, and the overall transition was quite close to the predicted values. FIG. 6B illustrates a sharp optical transition, FIG. 7B illustrates a smooth optical transition, and FIG. 8B illustrates an oscillating transition with an irregular period. Accordingly, this new waveform structure performs at least as well as standard push-pull driving, with the benefit of different transition appearance that could be considered more pleasant or desired for specific applications.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A method for driving an electrophoretic medium comprising at least four types of particles, wherein each particle has a different optical property from each other, and each type of particle has a different combination of charge polarity and charge magnitude from each other, the method comprising:
providing a continuous driving waveform for at least 500 ms, wherein the continuous driving waveform has at least 16 unique voltage levels during the at least 500 ms, the continuous driving waveform has a rate of change measurable in V/ms and the time-dependent change in the rate of change is between $-1V/ms^2$ and $1V/ms^2$.

2. The method of claim 1, wherein the waveform includes at least 32 unique voltage levels during the at least 500 ms.

3. The method of claim 1, wherein the at least four types of particles include two particles of a first polarity and two particles of a second polarity.

4. The method of claim 1, wherein the at least four types of particles include three particles of a first polarity and one particle of a second polarity.

5. The method of claim 1, wherein the optical property is color and the color is selected from the group consisting of white, red, magenta, orange, yellow, green, cyan, blue, violet, and black.

6. The method of claim 1, wherein at least two types of particles include surface polymers, and wherein each of the two types of particles has a different kind of surface polymer.

7. The method of claim 1, wherein the continuous driving waveform lasts at least 1 second.

8. The method of claim 1, wherein the continuous driving waveform lasts at least 5 seconds.

9. A method for determining a continuous waveform for driving an electrophoretic medium disposed between a first light transmissive electrode and a second electrode, the electrophoretic medium including at least four types of particles, wherein each type of particle has a different optical property from each other, and each type of particle has a different combination of charge polarity and charge magnitude from each other, the method comprising:
determining a first optical state for the electrophoretic medium;
determining a second optical state for the electrophoretic medium;
backpropagating iterative driving voltages for a frame width across a desired time span from the second optical state to the first optical state, wherein a transition between frames does not involve a voltage change of more than +40V; and
assembling the iterative driving voltages to produce a continuous waveform.

10. The method of claim 9, wherein the continuous waveform between the first optical state and the second optical state does not have a change in the rate of change of voltage as a function of time that is less than $-1V/ms^2$ or greater than $1V/ms^2$.

11. The method of claim 9, wherein the first optical state is a current color displayed by the electrophoretic medium.

12. The method of claim 9, wherein the second optical state is a target color displayed by the electrophoretic medium.

13. The method of claim 9, wherein the desired time span is at least 500 ms, and the frame width is less than 50 ms.

14. The method of claim 9, wherein a transition between iterative driving voltages during each frame width is less than or equal to 50V.

15. The method of claim 9 further comprising determining a transfer function for an optical state of the electrophoretic medium as a function of time based on outputs of a differentiable surrogate model for each iterative driving voltage used to transition from the first optical state to the second optical state, wherein the differentiable surrogate model is a model of the electrophoretic medium between the first light transmissive electrode and the second electrode.

16. The method of claim 15, wherein the transfer function is based on a voltage applied to the electrophoretic medium as a function of time given an initial state of the system.

17. The method of claim 16, wherein the transfer function is further based on one or more of ambient temperature, relative humidity, and incident light spectrum.

* * * * *